(12) United States Patent
Level

(10) Patent No.: US 11,358,513 B1
(45) Date of Patent: Jun. 14, 2022

(54) STRAP WINCH ASSEMBLY

(71) Applicant: Jack R. Level, Plano, TX (US)

(72) Inventor: Jack R. Level, Plano, TX (US)

(*) Notice: Subject to any disclaimer, the term of this patent is extended or adjusted under 35 U.S.C. 154(b) by 161 days.

(21) Appl. No.: 16/846,299

(22) Filed: Apr. 11, 2020

(51) Int. Cl.
| | |
|---|---|
| *B60P 7/08* | (2006.01) |
| *B66D 1/04* | (2006.01) |
| *B66D 5/02* | (2006.01) |
| *B66D 1/34* | (2006.01) |

(52) U.S. Cl.
CPC ............ *B60P 7/083* (2013.01); *B60P 7/0846* (2013.01); *B66D 1/04* (2013.01); *B66D 1/34* (2013.01); *B66D 5/02* (2013.01)

(58) Field of Classification Search
CPC .......... B60P 7/083; B60P 7/0846; B66D 1/04; B66D 1/34; B66D 3/02; B66D 3/14; B66D 2700/05; B66D 5/02
See application file for complete search history.

(56) References Cited

U.S. PATENT DOCUMENTS

| | | | | |
|---|---|---|---|---|
| 3,163,400 A | * | 12/1964 | Skerry | B66D 5/32 254/369 |
| 3,224,735 A | * | 12/1965 | Linde | B66D 3/14 254/344 |
| 3,248,087 A | * | 4/1966 | Hallen | B66D 3/14 254/376 |
| 5,282,706 A | * | 2/1994 | Anthony | B60P 3/10 24/68 CD |
| 7,503,736 B1 | * | 3/2009 | Chen | B60P 7/083 410/100 |
| 2014/0008593 A1 | * | 1/2014 | Kingery | B66D 3/02 254/376 |
| 2014/0117137 A1 | * | 5/2014 | Diamond | B60P 7/083 242/384.2 |
| 2019/0255984 A1 | * | 8/2019 | Kingery | B60P 7/083 |
| 2021/0122287 A1 | * | 4/2021 | Mollick | F16G 3/006 |
| 2021/0170937 A1 | * | 6/2021 | Chen | B60P 7/0846 |

* cited by examiner

*Primary Examiner* — Michael E Gallion
(74) *Attorney, Agent, or Firm* — Jeffrey Roddy

(57) ABSTRACT

A strap winch apparatus includes a frame with a drum gear connected to a drum. The drum is configured to receive an end of a strap whereby the strap is wound around or unwound from the drum when the gear is rotated. The frame also includes a braking member to arrest inadvertent reverse rotation of the drum to maintain strap tension. A handle configured to engage with the drum includes a pivotable pawl. One end of the pawl is configured to engage the gear teeth of the drum gear and index the drum gear in order to tension the strap about the drum. An opposite end of the pawl is configured to displace the braking member whereby the gear and drum are permitted to rotate in a direction loosening the strap tension. Typically, the braking member has a gear tooth engaging portion and a striking portion that may be in intermittent contact with the pawl for controlled loosening of the strap tension.

3 Claims, 5 Drawing Sheets

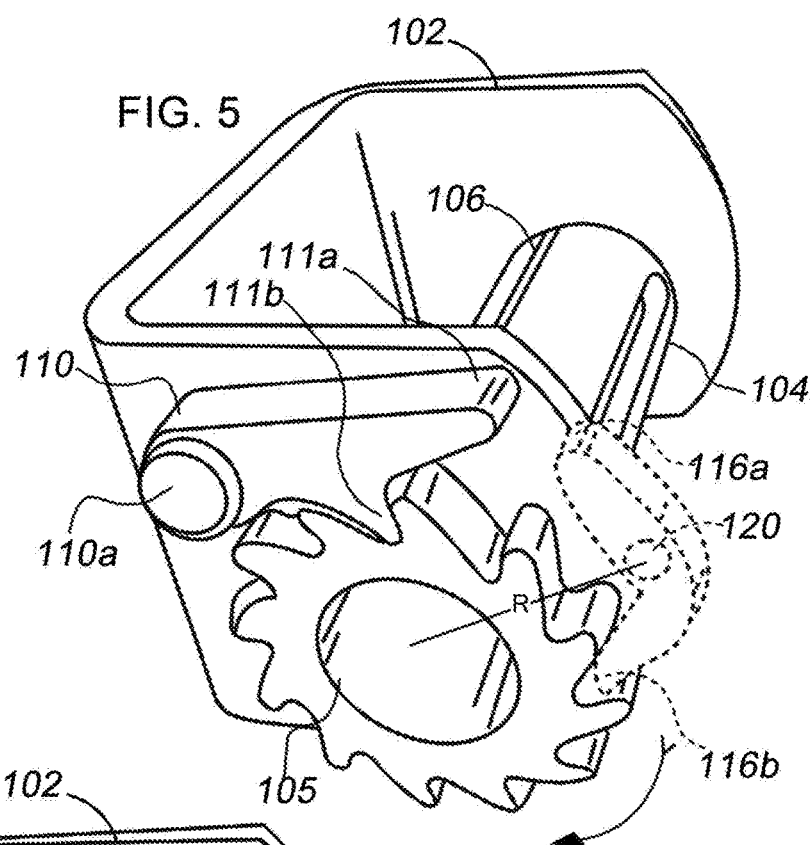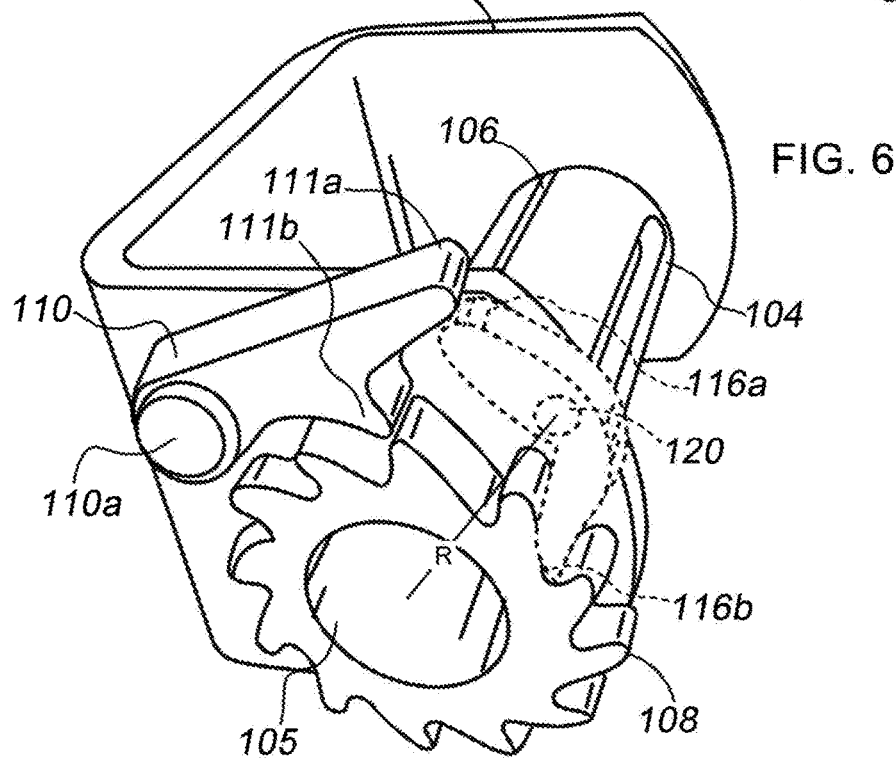

STRAP WINCH ASSEMBLY

TECHNICAL FIELD

The invention relates generally to winches and more specifically strap tie down winches for trailer cargo.

BACKGROUND

Cargo tie down strap winches are long known in the art and typically include a winding drum about which a length of strap is wound, and a means of securing the strap at a desired tension. Typically, the winding drum will be coupled to a drum gear which is prevented from (loosening) rotation by a brake, a stop or a wedge which may be a spring biased pawl that permits strap (tensioning) rotation of the winding drum but prevents loosening rotation. In some installations the braking member is pivotable and contacts the drum gear due to gravity alone. Strap winches also typically include a cylindrical winding bar that is engageable with a hub connected to, or joined in some way to the drum. In many winches, the hub includes a number of spaced apertures about the hub whereby the drum is wound by inserting the winding bar into the recesses and winding the hub/drum. One problem when using a winding bar to wind the drum is the necessity of inserting and removing the bar multiple times from circumferential apertures about the drum. Another problem arises when loosening strap tension. When the drum brake is disengaged, typically by force; e.g., tap of a hammer, the drum will unwind uncontrollably and the strap will lose all tension.

It would be desirable to provide a winch with a ratcheting handle that would eliminate the necessity of removing and reinserting a winding bar multiple times into a hub when tensioning the strap.

It would be desirable to provide a winch with a ratcheting handle that permits controlled tensioning of a strap wound about a winch drum.

It would be further desirable if such a ratcheting handle were to include a mounting member engageable with the drum member.

Even further desirable would be a ratcheting handle allowing controlled or partial loosening of a wound strap by intermittent displacement and engagement of the drum braking member with the drum gear.

SUMMARY

In a general example implementation of the present invention, a winch apparatus includes a frame with a drum gear connected to a strap winding drum. The drum is configured to receive an end of a strap whereby the strap may be wound around or unwound from the drum when the drum gear is rotated. The frame also includes a braking member to arrest inadvertent rotation of the drum gear in order to maintain strap tension. A handle configured to engage with the drum includes a pivotable pawl. One end of the pawl is configured to engage the drum gear teeth and index the drum gear in order to tension the strap about the drum. An opposite end of the pawl is configured to displace the braking member whereby the drum gear and drum are permitted to rotate in a direction loosening the strap tension. Typically, the braking member has a gear tooth engaging end and a striking end that may be in intermittent contact with the pawl.

In an aspect combinable with the general implementation, the handle is pivotable.

In an aspect combinable with any other aspect, a handle pawl is pivotable such that one or more portions of the pawl may be brought into contact with one or more teeth of the drum gear.

In an aspect combinable with any other aspect, a handle pawl is pivotable such that one or more portions of the pawl may be brought into contact with one or more portions of the braking member when the handle is pivoted.

In an aspect combinable with any other aspect, an end portion of the handle pawl configured to contact a striking portion of the braking member may have a rounded contour.

In an aspect combinable with any other aspect, one end of the handle pawl may be in contact with one or more teeth of the drum gear and another end of the handle pawl is simultaneously in contact with portions of the braking member.

In an aspect combinable with any other aspect, the handle may have a portion configured for insertion into an aperture of the drum.

In an aspect combinable with any other aspect, the handle may be configured to accept a cheater bar.

Other advantages of the present invention will become apparent from the following descriptions, taken in connection with the accompanying drawings wherein by way of illustration and example, various implementations of the present invention are disclosed.

BRIEF DESCRIPTION OF THE DRAWING FIGURES

FIG. 5 is a perspective view that omits the handle and shows a first position of an example handle pawl in dashed line;

FIG. 6 is a perspective view that omits the handle and shows a second position of an example handle pawl in dashed line;

REFERENCE TO THE NUMBERED ELEMENTS

Figure 1:
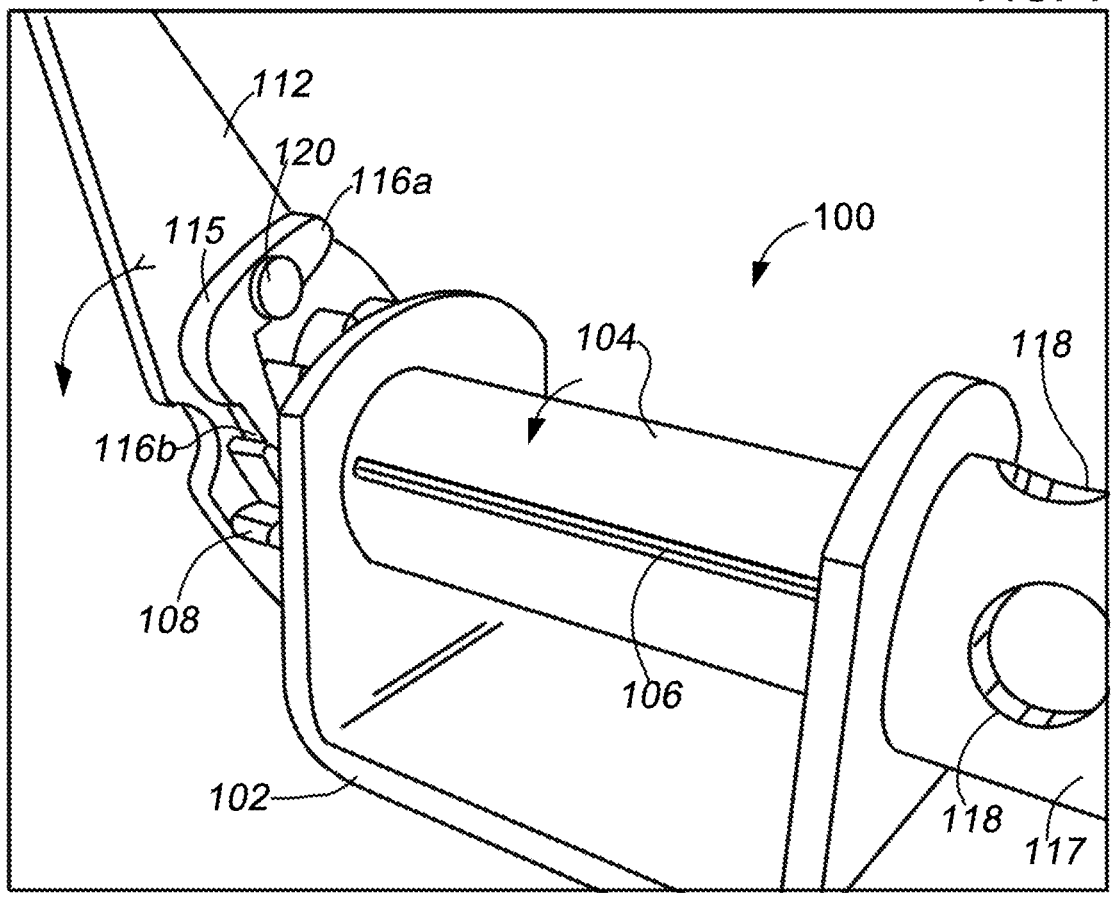
FIG. 1 is a perspective view of an example implementation of a winch apparatus according to the present invention.

100 winch apparatus
102 frame
104 drum
105 drum opening
106 drum slots
108 drum gear
110 braking member
110*a* brake member pivot
111*a* tooth engaging portion
111*b* striking portion
112 handle
114 handle mounting member
115 pawl
116*a* braking member contacting portion
116*b* gear tooth contacting portion
117 winding hub 118 winding aperture
120 pivot

Definitions

In the following description, unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references listed in this disclosure are incorporated by reference in their entirety for all purposes. In case of conflict, the present specification, including explanations of terms, will control. In addition, the materials, methods, and examples are illustrative only and not intended to be limiting. It should be understood that any aspect or implementation shown herein may be combined with any other aspect or implementation shown herein and still encompass the present invention. For purposes of clarity, "wound strap" or "strapping" referred to in the following description is omitted in the figures as the relationship of the wound strap to the apparatus is clear from the present disclosure and its inclusion would obscure relevant details of the apparatus. The term "tensioning" or "strap tension" refers either to the tightening or the tautness of a strap about a winding drum depending on the context. Relatedly, a strap can be tensioned about a drum by winding the drum in either a clockwise or counter-clockwise direction depending on the particular implementation.

DETAILED DESCRIPTION OF THE EMBODIMENTS

Referring generally to FIGS. 1-8, a winch apparatus assembly (100) includes a frame (102) with a drum gear (108) connected to a strap winding drum (104). Drum (104) is configured to receive an end of a strap whereby the strap is wound around or unwound from the drum when the drum gear (108) is rotated. Frame (102) also includes a braking member (110) that may pivot around pivot (110a) to engage with and arrest inadvertent rotation of the drum gear (108) in order to maintain wound strap tension. Pivot (110a) may be spring (not shown) tensioned or biased by means that will be appreciated by those having skill in the art. Handle (112) is configured to engage with drum (104) and includes a pivotable pawl (115) that is moved in a radius (R) when the handle is moved. An end (116b) of pawl (115) is configured to engage the drum gear teeth and thereby rotatably index the drum gear when the handle is pivoted in order to tension the strap about the drum. Another end (116a) of the pawl is configured to displace the braking member (110) whereby the drum gear and drum are permitted to rotate in a direction loosening the strap tension. Typically, the braking member has a gear tooth engaging portion (111a) and a striking portion (111b) that may be in intermittent contact with pawl (115). Handle (112) is pivotable when mounting member (114) is inserted into drum opening (105), an aperture, or otherwise secured yet removably engaged with the drum. Pawl is pivotable about pivot (120) and the pawl has two ends that are generally balanced. Drum tension is increased by ratcheting the drum gear (108) via the gear tooth contacting portion (116b) of pawl (115) in a winding direction where the braking member (110) is configured to stop unwinding of the drum (104) and loosening of a wound strap. Handle (112) may be moved to engage pawl (115) with braking member (110) thereby enabling the winding drum to lose strap tension. The amount of loosening may be controlled by engaging/disengaging the pawl with the striking portion of the braking member in short bursts. Some implementations may include a hub (117) (FIGS. 1, 3) with winding apertures (118) that may be used as an alternative strap winding/tensioning means when a pole or rod is inserted into the apertures and the drum is thereby tensioned.

FIG. 1 is a perspective view showing the strap winch apparatus (100) with a frame (102), a winding drum (104), one or more strap insertion slots (106), a winding hub (117) with winding apertures (118), a drum gear, a handle (112) with a pivotable pawl (115) mounted thereon, a drum gear braking member (110) and a mounting member (114) as an extension of handle (112) configured to eliminate lateral movement of the handle when the handle is longitudinally inserted into the drum. It should be understood that length of the mounting member (114) may vary and need not extend beyond the boundaries of the frame (102) and hub (117) (if any). Other handle securing, mounting or attachment elements and methods may suggest themselves to those having skill in the art and access to this disclosure.

Figure 2:
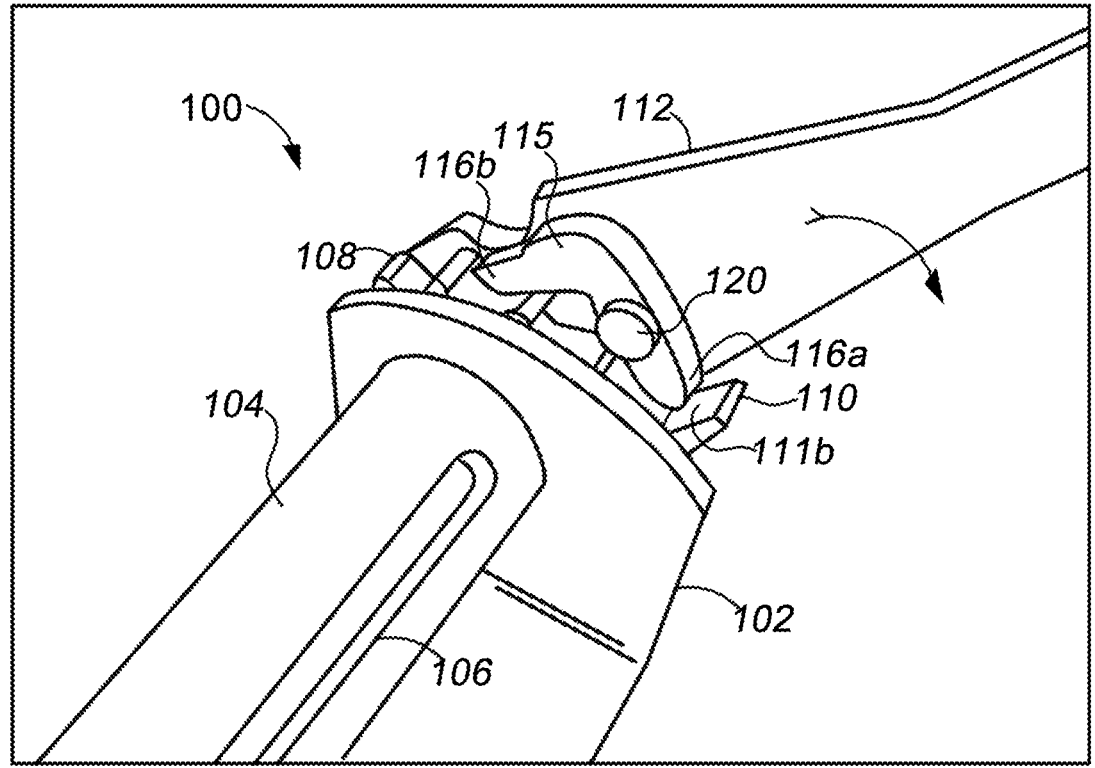
FIG. 2 is another perspective view thereof.
Figure 3:
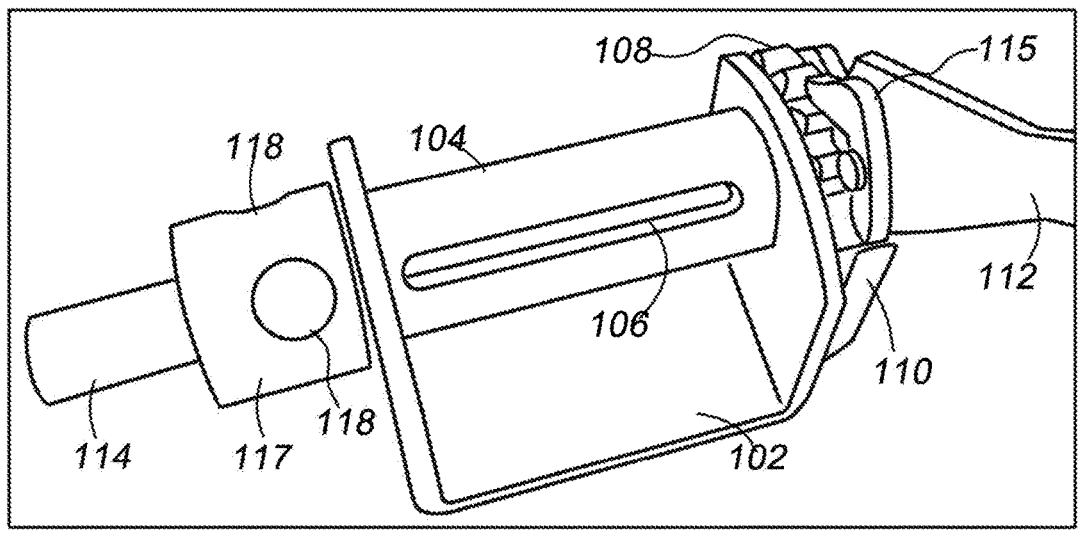
FIG. 3 is another perspective view thereof.

FIG. 2 is another perspective view showing portions of the pawl (115) in contact with a striking portion (111b) of the braking member (110). In the particular illustration, pawl (115) is shown having moved from a position where the gear tooth contacting portion (116b) is fully engaged between teeth of drum gear (108) (FIG. 1), and a position where braking member contacting portion (116a) is in a lowered position and contacts braking member (110) at striking portion (111b). It should be noted that braking member contacting portion (116a) includes a rounded contour so that it may ride over gear teeth and slide along the striking portion (111b) without obstruction. FIG. 3 is a top down perspective view thereof.

Figure 4:
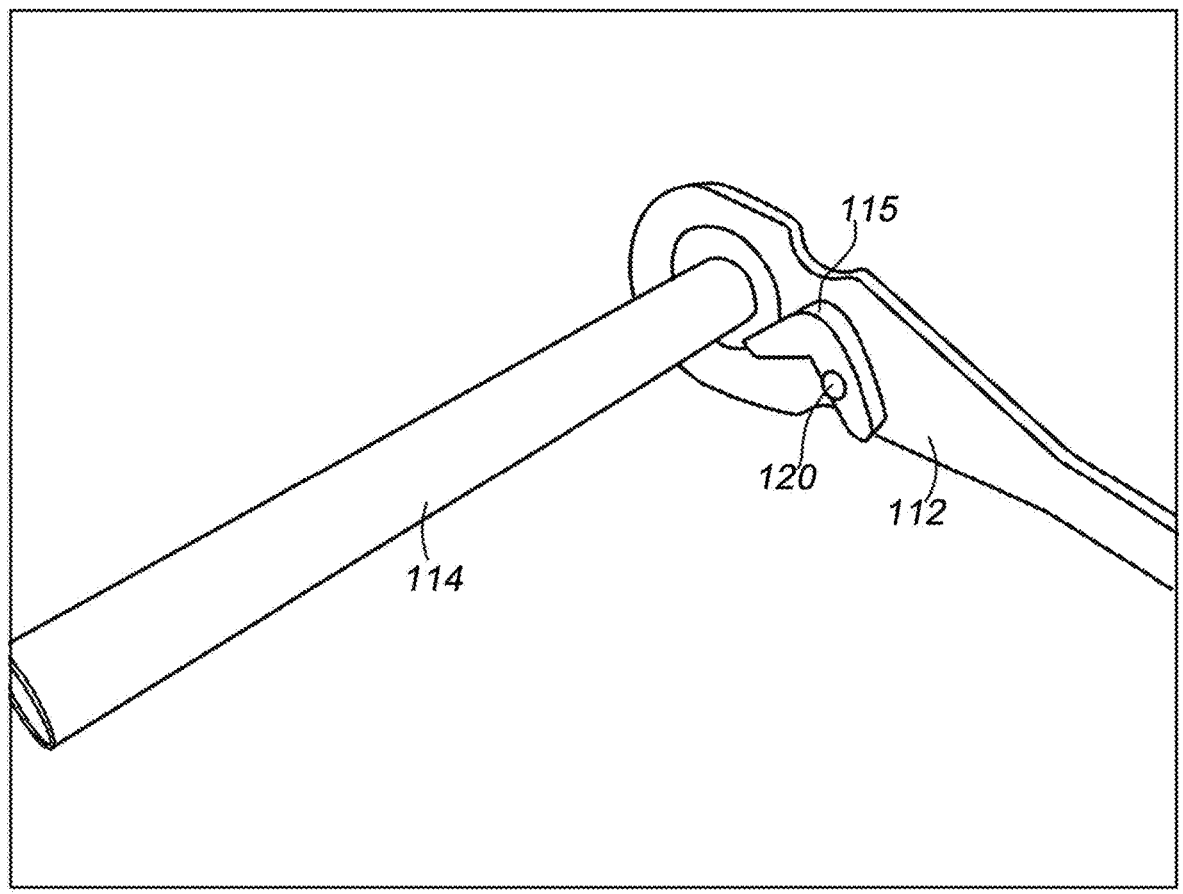
FIG. 4 is a perspective view of an example handle member separable from the frame (102)

FIG. 4 is a perspective view of an example implementation of a handle (112) shown removed from the assembly (100).

Figure 7:
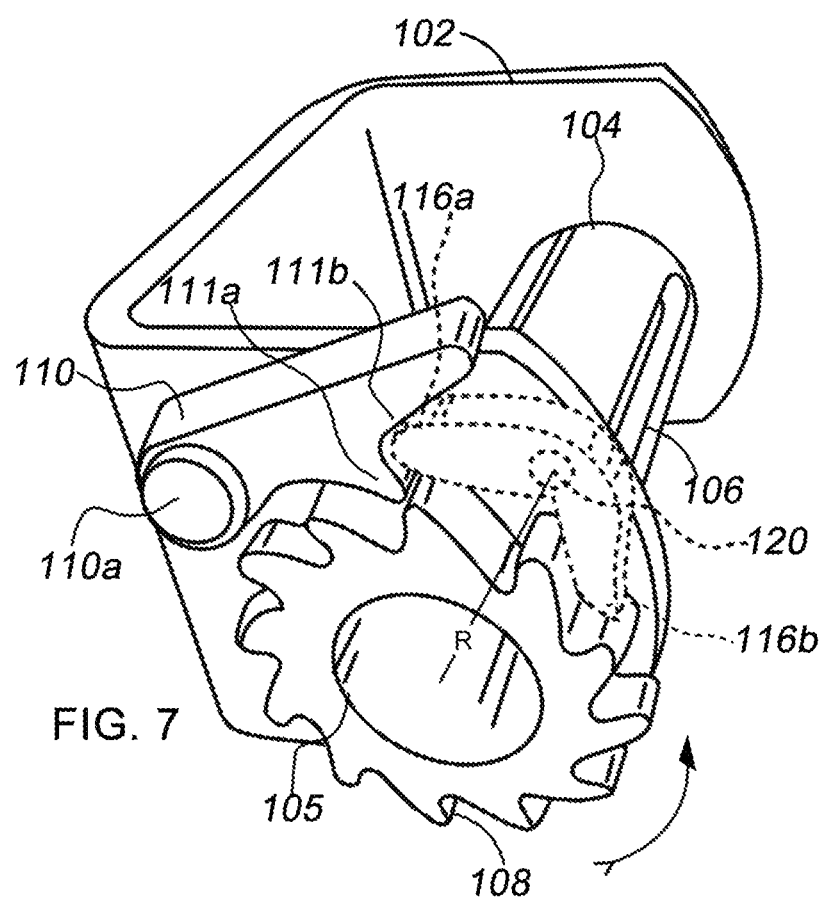
FIG. 7 is a perspective view that omits the handle and shows a third position of an example handle pawl in dashed line.

FIGS. 5-7 for purposes of clarity, omit handle (112) in order to better illustrate various positions for pawl (115) as it moves via pivot (120) in a radius (R) and tips forward and backward depending on the handle position forward or backward respectively. In FIG. 5, pawl (115) is fully engaged between gear teeth and is urged forward to ratchet drum gear (108) in the direction of arrow (a), and braking member is fully engaged with the drum gear to prevent unwinding rotation of the drum; See also (FIG. 1), that shows winding rotation of drum gear (108). In FIG. 6, pawl (115) is moved rearwardly to make contact with the upper part of the striking portion (111b) of braking member (110) while the gear tooth contacting portion (116b) of pawl (115) is transitioning out of contact with the gear teeth. In FIG. 7, further rearward movement of the pawl causes the braking member contacting portion (116a) to slide and tip, causing the gear tooth contacting portion (116b) to fully disengage with the gear teeth and allow for unwinding rotation.

Figure 8:
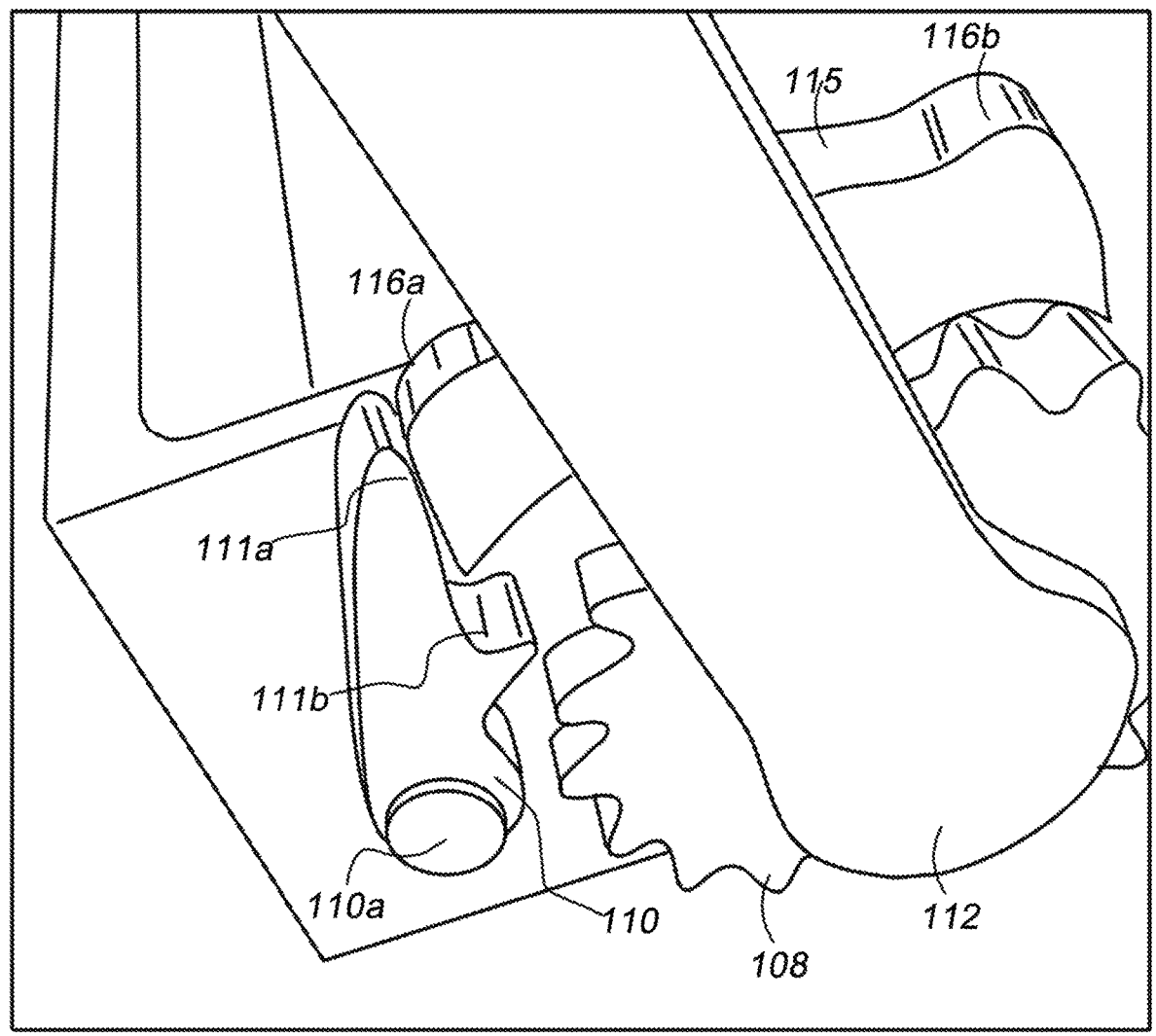
FIG. 8 is a perspective view that shows another example implementation of a handle pawl contacting a braking member.

FIG. 8 shows an implementation with a differently shaped and sized pivoting pawl (115), however still including an end configured to engage with gear teeth and an opposite end with a rounded contour adapted to displace a braking member (110).

It should be understood that the drawings and detailed description herein are to be regarded in an illustrative rather than a restrictive manner, and are not intended to be limiting to the particular implementations, forms and examples disclosed. Accordingly, it is intended that this disclosure encompass any further modifications, changes, rearrangements, substitutions, alternatives, design choices, and implementations as would be appreciated by those of ordinary skill in the art having benefit of this disclosure, and falling within the spirit and scope of the following claims.

What is claimed is:

1. A winch assembly comprising:
   a frame;
   a drum;
   a drum gear configured to rotate the drum;
   a braking member adapted to prevent inadvertent reverse rotation of the drum;
   an attachable and detachable handle member including at least one mounting member configured for engagement with the drum gear, and a pawl pivotably mounted to the handle;
   the pawl including a first end with a gear tooth engaging member and a second end opposite the first end including a curved portion configured for contact with the braking member and intermittent displacement of the braking member.

2. The braking member according to claim 1, further comprising a striking portion adapted for contact with the pawl.

3. The braking member according to claim 1, further comprising a drum gear engagement portion.

* * * * *